(12) United States Patent
Blaschke et al.

(10) Patent No.: US 7,013,423 B2
(45) Date of Patent: Mar. 14, 2006

(54) OMITTING FORWARDER PAGES IN A HISTORY LIST IN A BROWSER

(75) Inventors: David Earl Blaschke, Austin, TX (US); Scott Thomas Jones, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 10/185,509

(22) Filed: Jun. 27, 2002

(65) Prior Publication Data

US 2004/0003346 A1 Jan. 1, 2004

(51) Int. Cl.
*G06F 17/21* (2006.01)
(52) U.S. Cl. .................................................. 715/501.1
(58) Field of Classification Search ............. 715/501.1, 715/513, 500
See application file for complete search history.

(56) References Cited

U.S. PATENT DOCUMENTS

| | | | | |
|---|---|---|---|---|
| 5,892,917 A | * | 4/1999 | Myerson | 709/224 |
| 6,108,799 A | | 8/2000 | Boulay et al. | 714/38 |
| 6,578,078 B1 | * | 6/2003 | Smith et al. | 709/224 |

OTHER PUBLICATIONS

"PageJumper—Web Page Redirector", [http://web.archive.org/web/20010706155636/http://innerpeace.org/pagejumper.shtml], crawled by Internet Archive on Jul. 6, 2001, pp. 1-8.*

"Dan's Web Tips: Auto-Refreshing Pages", [http://web.archive.org/web/20020827134203/http://webtips.dan.info/refresh.html], crawled by Intenet Archive on Apr. 6, 2002, pp. 1-5.*

"Page Redirection", [http://web.archive.org/web/20000617001035/http://grizzlyweb.com/webmaster/javascripts/redirection.asp], crawled by Internet Archive on Jun. 17, 2000, pp. 1-5.*

Baker, A. "Push and Pop on the Web", posted at [http://www.merges.net/theory/20010521.html]on May 21, 2001, pp. 1-3.*

Greenberg, S. and Cockburn, A. "Getting Back to Back: Alternative Behaviors for a Web Browser's Back Button", Proceedings of the 5th Annual Human Factors and the Web Conference, Jun. 1999, pp. 1-12.*

"Web Display Profiling", IBM Technical Disclosure Bulletin, issue 427, published Nov. 1, 1999, pp. 1-4.*

Tauscher, L. and Greenberg, S. "Revisitation Patterns in a World Wide Web Navigation", Proceedings of the SIGCHI conference on Human Factors in computing systems, Mar. 1997, pp. 399-406.*

(Continued)

*Primary Examiner*—William Bashore
*Assistant Examiner*—Peter J. Smith
(74) *Attorney, Agent, or Firm*—Marilyn Smith Dawkins

(57) ABSTRACT

A system, method, and program controls a display of pages retrieved over a network by a browser program. A predetermined minimum threshold of time for displaying a page is required before the page can be included in a browser history list that is used to satisfy "Back" and "Forward" requests from a user. For each page, if the length of time that the page is displayed is less than the minimum threshold of time, then the page, or a reference to the page, is not stored in memory in the history list. In this way, pages that merely forward or reference another page, i.e., forwarder pages, are not included in the history list. As such, a forwarder page will not be included in the sequence of pages when a "Back" function is utilized by a user.

12 Claims, 5 Drawing Sheets

OTHER PUBLICATIONS

Washingtonpost.com: Programs to Pummel Pop-Ups, 1 page, Http://www.washingtonpost.com/ac2/ . . . n/A49184-Feb. 9, 2002?language=printer.

ShiftHEAD—All Thumbs, 3 pages, wysiwyg://44/http://www.shifthead.com/software/all_thunbs/default.htm.

A1Tech:Block annoying pop-up and . . . ver monitoring software A 1 Monitor! 8 pages, wysiwyg://63/http://www.a1tech.com/.

BooHoo's Help & Hint's & Tip's Page, 8 pages, http://software.xfx.net/~bruce/.

HistoryKill—Protect your Privacy onthe Internet for FREE! 3 pages, http://www.historykill.com/index.asp?filename=144.

GuardWall, Inc.—Guard-IE Privacy . . . rivacy Software, Personal Firewall, 5 pages, http://www.failsafetechnoloies.com /English/GuardIE/index.asp.

Details for UltiMark—Powerful B0 . . . igation features to most browsers! 8 pages, http://www.ultimark.com/details.htm.

XFX JumpStart: PopUp Killer: Product Description, 17 pages, http://software.xfx.net/utilities/popupkiller/.

Popup Killer—CNETAsia, 2 pages, wysiwyg://50/http://asia.cnet.com/ . . . swinfo/0,39000587,38019896s,00.htm.

PopUp Killer—CNETAsia, 2 pages, wysiwyg://45/http://asia.cnet.com/ . . . swinfo/0,39000587,39006691s00.htm.

AdsGone Popup Killer—CNETAsia, 2 pages, wysiwyg://40/http://asia.cnet.com/ . . . swinfo/0,39000587, 39005263s00.htm.

Panicware.com—Pop-Up Stopper Pro . . . p-Up Killer to stop web popup ads!, 2 pages, http://www.panicware.com/product_popupstopperpro.html.

Popup Ad Filter—Stop PopUp Windows, 4 pages, http://www.meaya.com/.

PopupDummy!—CNETAsia, 2 pages, wysiwyg://54http://asia.cnet.com/ . . . swinfo/0,39000587,38015372s,00.htm.

IBM Docket ROC920010149US1, U.S. Appl. No. 09/973,158, Method, Apparatus and Computer Program Product For Eliminating Unnecessary Dialog Box Pop-Ups, 15 pages, file date Oct. 09, 2001.

IBM Docket AUS920000453US1, U.S. Appl. No. 09/704,596, Multidimensional Browser Visual History Thread Viewer, 45 pages, file date Nov. 02, 2000.

IBM Docket AUS920000199US1, U.S. Appl. No. 09/657,120, Method and System for Previewing Visual History Sessions, 37 pages, file date Sep. 7, 2000.

* cited by examiner

OMITTING FORWARDER PAGES IN A HISTORY LIST IN A BROWSER

BACKGROUND OF THE INVENTION

1. Field of the Invention

This invention relates to displaying information through a browser window at a client computer system connected to a network, and more specifically to enabling a user to go back from a currently displayed page to a previously displayed page even though there may have been forwarder pages in-between.

2. Description of the Related Art

As computational devices continue to proliferate throughout the world, there also continues to be an increase in the use of networks connecting these devices. Computational devices include large mainframe computers, workstations, personal computers, laptops and other portable devices including wireless telephones, personal digital assistants, automobile-based computers, etc. Such portable computational devices are also referred to as "pervasive" devices. The term "computer" or "computational device", as used herein, may refer to any of such device which contains a processor and some type of memory.

The computational devices may be connected in any type of network including the Internet, an intranet, a local area network (LAN) or a wide area network (WAN). The networks connecting computational devices may be "wired" networks, formed using lines such as copper wire or fiber optic cable, wireless networks employing earth and/or satellite-based wireless transmission links, or combinations of wired and wireless network portions. Many such networks may be organized using a client/server architecture, in which "server" computational devices manage resources, such as files, peripheral devices, or processing power, which may be requested by "client" computational devices. "Proxy devices" can act on behalf of other machines, such as either clients or servers.

A widely used network is the Internet. The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web". Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

A Web browser is a software program running at a client computer system that displays Web pages from the Internet. The Web browser displays the information by interpreting the markup language (e.g., Hypertext Markup Language, HTML; Wireless Markup Language, WML; Extensible Markup Language, XML; Standard Generalized Markup Language, SGML, etc.) used to build home pages on the Web. The coding in a markup language file tells the browser how to display the text, graphics, links and multimedia files on the home page. If the browser itself is unable to display the file, the browser may utilize a plug-in, such as a multimedia player or audio player, to present the file to the user. The Web browser also interprets HTML tags within the HTML document as links to other Web sites, or to Web resources, such as graphics, multimedia files, news groups, or files to download.

Sometimes these links to other Web sites automatically produce advertisements that appear on the user's display. The browser opens another window to show the advertisement content. These advertisements appear to "pop-up" on the user's display screen in separate windows automatically by the browser. It is not uncommon for one advertising window to contain links to other advertising content such that a succession of browser windows are being generated. Needless to say, this can be annoying to users.

Another technique used by advertisers and others that tends to annoy users is the effective redefinition of the "Go Back" feature of the browser through the use of hidden forwarder pages. A forwarder page does nothing more than automatically forward the browser to another page without requiring any user interaction. As such, the forwarder page might not ever be displayed to the user; or if it is, it is only for a very short time. Sometimes the length of time that the page is displayed is so short that the user does not notice that it is being displayed; especially if the content of the forwarder page is empty.

This tactic of employing forwarder pages to get to an advertiser's displayed page makes it difficult for a user to leave the advertiser's displayed Web page. For example, a user currently displaying page P selects a link to what is thought to be page Q. Instead, the link sends the browser to a forwarder page, F1. Page F1 automatically sends the browser to page Q without user interaction and without displaying any information. When the user attempts to go back to page P from page Q, the "Go Back" feature, when selected on the browser by the user, actually sends the browser to page F1 which automatically, without any user interaction, takes the user to page Q again. This effectively disables the "Go Back" feature since the user cannot get back to page P from page Q. As such, the user becomes stuck on page Q. If the user quickly clicks the "Go Back" feature multiple times in rapid succession, it may be possible to avoid page F1. However, if there is more than one intervening forwarder page, rapid clicking will still get the user back to one of the intervening forwarder pages, and then automatically back to the page the user tried to leave. As such, if a sequence of forwarder pages, F1 through Fn, are defined, it can be difficult to get back to page P.

For example, assume there were five forwarder pages, A, B, C, D, E. If a user clicks on a link in the current page, the current page would go to A then automatically to page B which would automatically go to page C which would automatically go to page D which would automatically go to page E in succession. Page E may then go to the page that the user intended to link to. Since the succession of these forwarded pages occurs so quickly, the user only perceives going from the current page to the desired link. However, if the user tried to click on the "Back" button on the browser, the browser would go back to the forwarder page and that page would take you right back, automatically, to the same page that the user tried to go back from.

It should be noted that the above problem is not limited to advertising windows. The problem also occurs intentionally, or unintentionally, by other Web page owners. For example, a Web page owner may decide to change its original home page. Instead of removing the original home page, the Web page owner changes it so that it forwards the user to a different home page. As such, when the original home page is referenced using the same URL, the different home page will appear instead of the original home page. However, if the user wanted to get back to where the user was before going to that home page, the user would be returned automatically to the different home page from the original home page now performing as a forwarder.

SUMMARY OF THE INVENTION

It is therefore an object of the invention to enable a user utilizing a browser to go back to a previously displayed page even though there may be an intervening forwarder page.

The system, method, and program of the invention adds an option to the browser which defines a minimum time that a page must be visible before it is put in the browser history list and in the queue for the "Go Back" button in the browser. Therefore, pages which appear, if at all, for only a very short time, such as forwarder pages, cannot prohibit the user from returning to the previous page that was actually viewed by the user. As such, the browser only stores in memory, e.g., such as a browser history list, links to pages that have been displayed for a specified minimum amount of time. The minimum amount of time can be specified by a user or preprogrammed into the browser.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

The present invention is carried out by a browser program running on a client processing system that accesses pages from a server processing system over a network. The client and server systems may be any one of a variety of systems, including a variety of computing systems and electronic devices under a number of different operating systems. In one embodiment of the present invention, the client computing system is a portable computing system such as a notebook computer, a palmtop computer, a personal digital assistant, a telephone or other electronic computing system that may also incorporate communications features that provide for telephony, enhanced telephony, messaging and information services. However, the client computing system, as well as the server system, may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Figure 1:
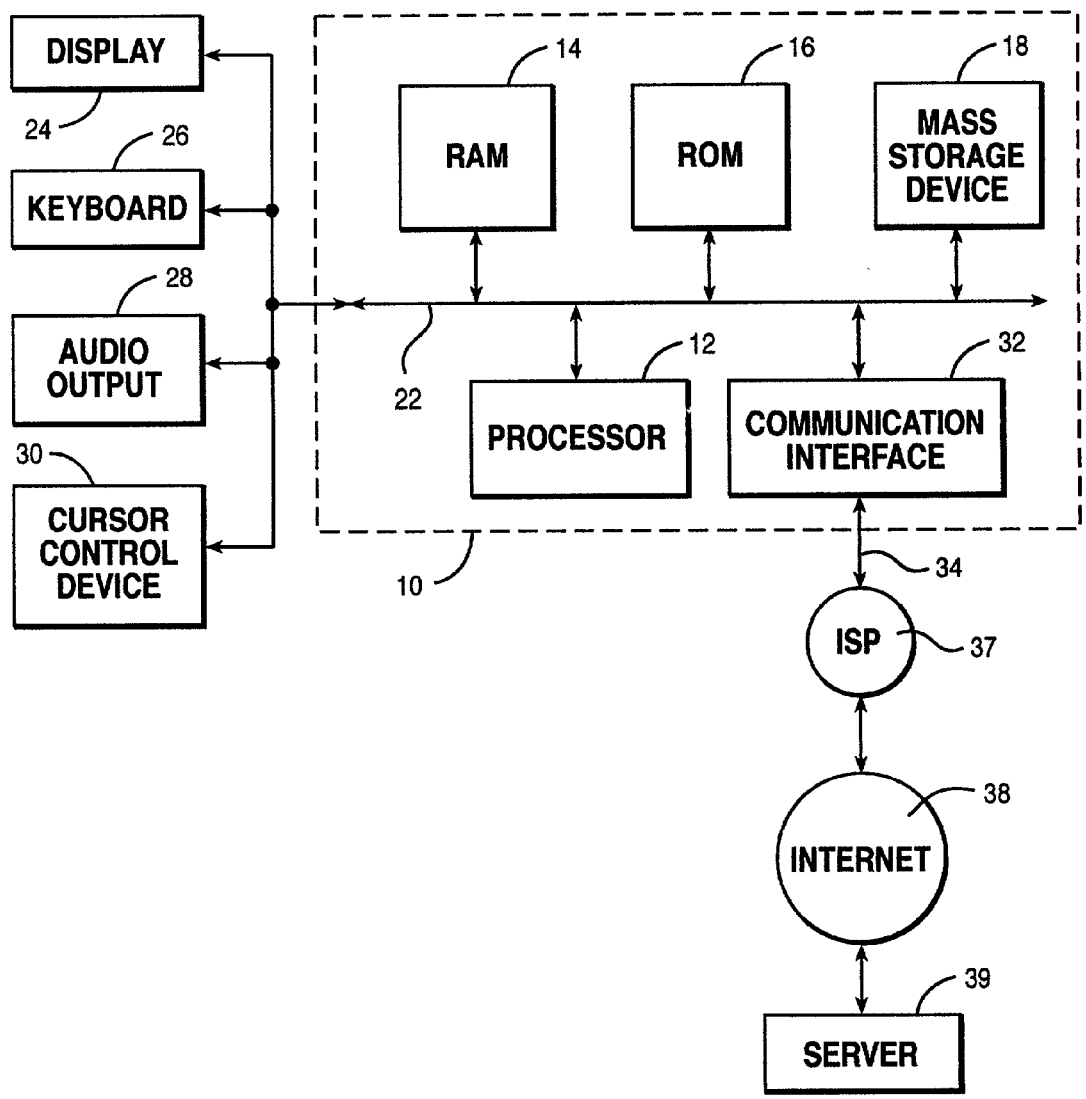
FIG. 1 depicts one embodiment of a computer system with which the method, system, and program of the present invention may be advantageously utilized.

Referring now to the drawings, and in particular to FIG. 1, there is depicted one embodiment of a computer system with which the method, system, and program of the present invention may be advantageously utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as a random access memory (RAM) 14 and a static storage device such as Read Only Memory (ROM) 16. The operating system preferably provides a graphical user interface (GUI) to the user. One application may include a client application (e.g., a browser) capable of sending requests to, and receiving information from, a server data processing system within a data processing system network, and displaying that information at the client. Client system 10 may execute one or more user applications, either within browser application or apart from browser application, which are capable of sending and retrieving data over the network to and from servers. Such user application(s) include the functionality describe below to omit forwarder pages from being included in a history list in the browser. As such, in a preferred embodiment, application software contains machine executable instructions that when executed on processor 12 carry out the operations depicted in the figures described herein. Alternatively, the steps of the present invention might be performed by specific hardware components that contain hardwire logic for performing the steps, or by any combination of programmed computer components and custom hardware components.

Further, multiple peripheral components may be added to computer system 10. For example, a display 24 is also attached to bus 22 for providing visual, tactile or other graphical representation formats. Audio output through a speaker or other audio projection device may be controlled by audio output device 28 attached to bus 22. A keyboard 26 and cursor control device 30, such as a mouse, track ball, or cursor direction keys, are coupled to bus 22 as interfaces for user inputs to computer system 10. It should be understood that keyboard 26 and cursor control device 30 are examples of multiple types of input devices that may be utilized in the present invention. In alternate embodiments of the present invention, additional input and output peripheral components may be added.

The present invention may be provided as a computer program product, included on a machine-readable medium having stored thereon the machine executable instructions used to program computer system 10 to perform a process according to the present invention. The term "machine-readable-medium" as used herein includes any medium that participates in providing instructions to processor 12 or other components of computer system 10 for execution. Such a medium may take many forms including, but not limited to, nonvolatile media, volatile media, and transmission media. Common forms of nonvolatile media include, for example, a floppy disk, a flexible disk, a hard disk, magnetic tape or any other magnetic medium, a compact disc ROM (CD-ROM), a digital video disc-ROM (DVD-ROM) or any other optical medium, punch cards or any other physical medium, a programmable ROM (PROM), an erasable PROM (EPROM), electrically EPROM (EE-PROM), a flash memory, any other memory chip or cartridge, or any other medium from which computer system 10 can read and which is suitable for storing instructions. In the present embodiment, an example of nonvolatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide are network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital or analog data streams. The signals through the various networks and the signals on network link 34 and through communications interface 32, which carry the digital or analog data to and from computer system 10, are exemplary forms of carrier waves transporting the information.

A data processing network may include one or more servers which are accessible as part of the Internet or other network, and one or more clients which may access servers. Content may be accessed using any of a variety of messaging system protocols including Hypertext Transfer Protocol (HTTP), File Transfer Protocol (FTP), Network News Transfer Protocol (NNTP), Internet Mail Access Protocol (IMAP) or Post Office Protocol (POP), etc. In a preferred embodiment, servers contain markup language Web pages including, but not limited to, Hypertext Markup Language (HTML) Web pages. Communications between data processing systems occur over the Internet and conform to the Hypertext Transfer Protocol (HTTP) in accordance with the known art.

Figure 2:
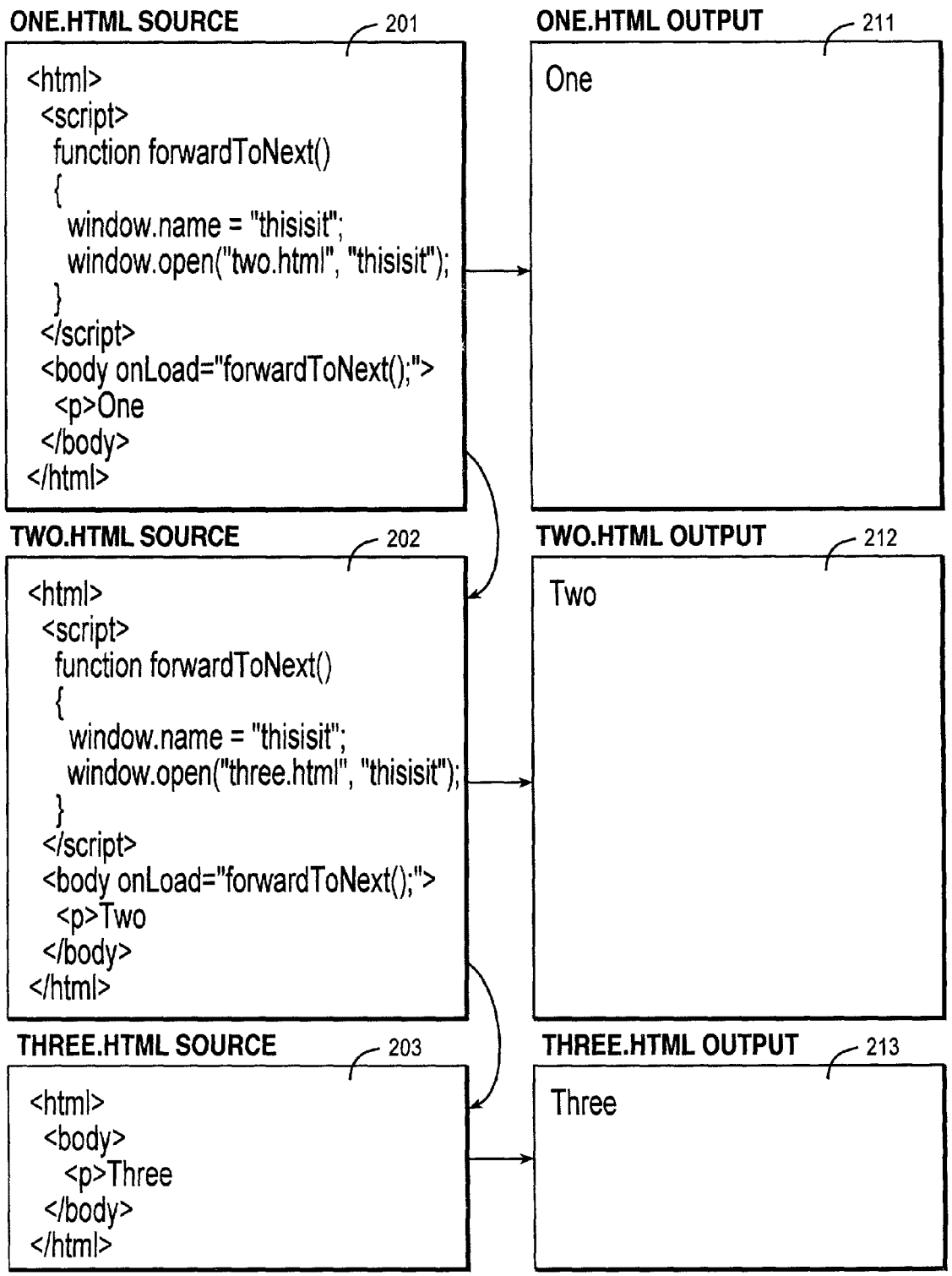
FIG. 2 illustrates three sample HTML source pages wherein page one.html and page two.html are forwarder pages for ultimately displaying page three.html.

FIG. 2 illustrates three sample HTML source pages wherein page "one.html source", 201, and page "two.html source", 202, are forwarder pages to page "three.html source", 203. More specifically, "one.html source" 201 automatically forwards the browser to page "two.html source" 202 which automatically forwards the browser to "three.html source" 203. Since the browser is automatically forwarded to source page "three.html" 203 if the user requests page "one.html" 201, neither page "one.html output" 211 nor page "two.html output" 212 are ever displayed to the user. Instead, if the user requests page "one.html" 201, the browser displays the content "Three" of "three.html output" 213.

Figure 3:
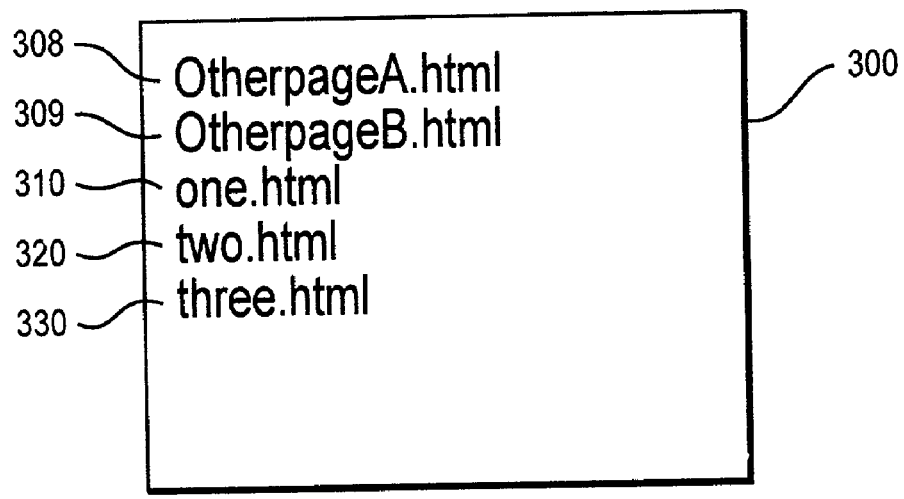
FIG. 3 illustrates a history list in memory utilized by a browser to keep track of a sequence of displayed Web pages, including forwarder pages, as is known in the art.

FIG. 3 illustrates a history list 300 in memory utilized by a browser to keep track of a sequence of displayed Web pages 308, 309, 310, 320, 330, including forwarder pages, as is known in the art. As shown, even forwarder pages "one.html" 310 and "two.html" 320 would be included in a history list utilized by the browser. Page "one.html" 310 and page "two.html" 320 (FIG. 3) corresponds to page "one-.html" 201 and page "two.html" 202 of FIG. 2, respectively.

Figure 4:
FIG. 4 illustrates a history list in memory utilized by a browser to keep track of a sequence of Web pages that are displayed for a minimum amount of time in accordance with a preferred embodiment of the invention.

FIG. 4 illustrates a history list 400 in memory utilized by a browser to keep track of a sequence of Web pages 408, 409, 430 that are displayed for a minimum amount of time in accordance with a preferred embodiment of the invention. If a user displayed other web pages such as "otherpageA.html" 408 and "otherpageB.html" 409, and theses pages were not forwarder pages such that they were indeed displayed to the user for a specified minimum amount of time, references to these pages 408, 409 would be kept in memory by the browser as shown in FIG. 4. If after displaying "otherpageB.html", the user requested page "one.html" 201 (FIG. 2), page "one.html" would not appear in the history list 400 after "otherpageB.html" 409 since page "one.html" was merely a forwarder page and never displayed by the browser for at least the specified minimum amount of time. Likewise, page "two.html" 202 (FIG. 2) would not be listed in history list 400 (FIG. 4). Since page "one.html" automatically forwards the browser to page "two.html" which automatically forwards the browser to page "three.html" 203 (FIG. 2), a reference 430 to page "three.html" is stored in the history list 400 (FIG. 4) immediately after "otherpageB.html" 409.

Figure 5:
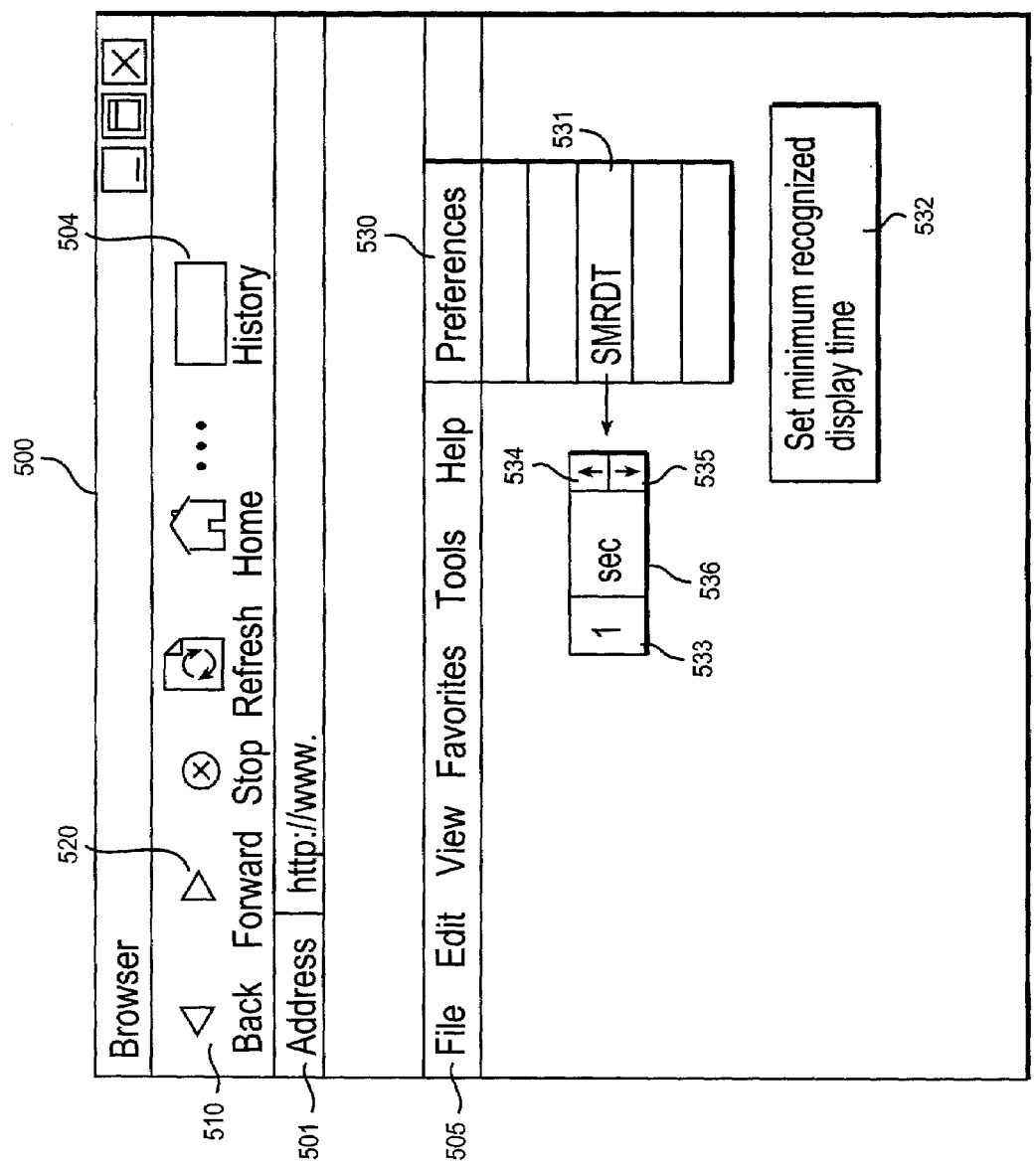
FIG. 5 illustrates an example of a browser user interface for receiving a user preference for setting a minimum amount of time that a page must be displayed to be included in the history list.

FIG. 5 illustrates an example of a user interface for a browser 500 for receiving a user preference for setting a minimum amount of time that a page must be displayed to be included in the history list. The browser 500 includes "Back" 510 and "Forward" 520 buttons, URL address input area 501, and the command bar 505 for which in one embodiment a "Preferences" 530 selection is utilized to enable a user to specify a minimum display time that the browser will recognize for adding a given page to the history list in memory. The selection SMRDT 531 when specified indicates "set minimum recognized display time" 532 which enables user input area 536 to display a field 533 for inputting a value and up 534 and down 535 scroll indicators for changing a given value 533. FIG. 5 indicates that the minimum value specified by a user is 1 sec. As such, in a preferred embodiment, if the browser does not display a page for one second or longer, then the page will not be referenced in the browser history list that it used when the "Back" and "Forward" buttons 510, 520 are utilized.

In other embodiments, other variations in the browser interface may be utilized to enable a user to specify the minimum time that a page should be displayed before a browser includes the page in the history list. Alternatively, in other embodiments, the minimum time that a browser will recognize a page as being displayed and included in the history list may be predetermined by the browser itself. In such an embodiment, the browser interface would not include such preference to be set by the user.

It should be further noted that use of the terminology "history list" herein is being used in a general way to refer to a list, in memory, of a sequence of pages displayed by the browser, and wherein the list is utilized by the browser in carrying out back and forward functions such as via the "Back" and "Forward" buttons 510, 520, respectively (FIG. 5). The use of the term "history list" may or may not be similar to the list generated by the "History" button 504 in browser 500. In some browsers, such a list is alphabetical and does not represent the actual sequence of the displayed pages. In such cases, the history list utilized herein would be different from the "history button" 504 On the other hand, other browser embodiments may indeed utilize a "History" button 504 which does reflect the sequence of displayed pages. In such cases, the use of "history list" herein would encompass the function of such a "History" button 504.

Figure 6:
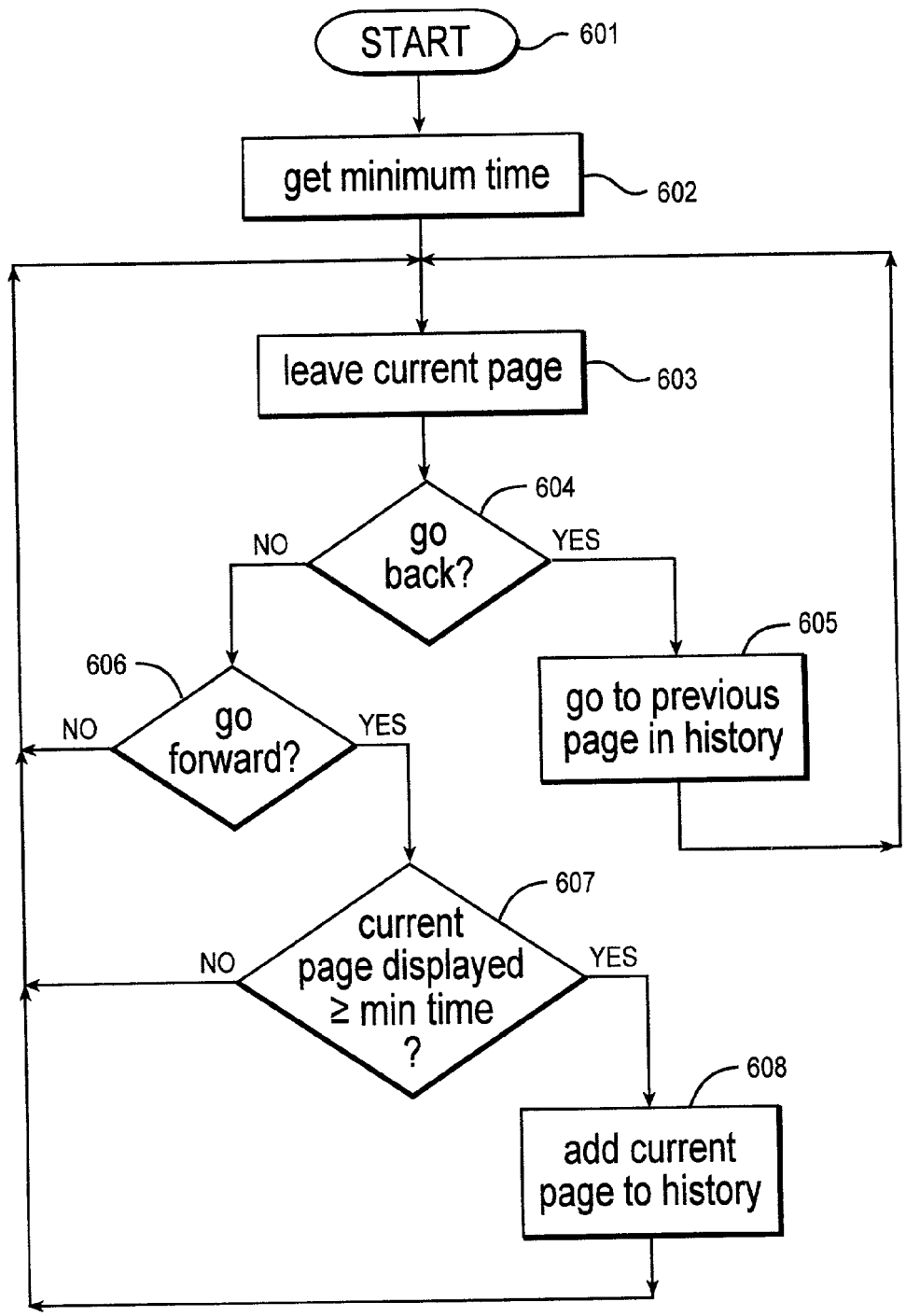
FIG. 6 illustrates a process flow and logic diagram for carrying out a preferred embodiment of the invention.

FIG. 6 illustrates a process flow and logic diagram for carrying out a preferred embodiment of the invention. The process begins 601 when the browser gets a minimum display time 602 needed for a given page to be included in the browser history list of sequentially displayed pages. The minimum display time can be received via a user preference or be inherent within the browser software itself. To leave a current page, 603, such as by a user action (e.g., by clicking on a link or button) or by an application action (e.g., jsp, javascript), the browser determines if an indication is received to go back to the previous page 604. If there is an indication to go back, then the browser goes to the previous page indicated in the history list, 605. If instead there is an indication for the browser to go forward, 606, such as through a link or forward button, the determination is made whether the current page was displayed for a time greater than or equal to the minimum specified time, 607. If it was, then the current page is added to the history, 608. The current page can then be returned to at a later time since it will be in the history list. If the current page that was left was not displayed for a time greater than or equal to the minimum time, 607 (no), then the page is not added to the history list. Since it is not included in the history, it will not be returned to should the browser receives an indication to go back to a previous page, 604.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or more computer programs, and/or data files accessible from one or more computer usable devices, carriers, or media. As such, the functionality of the above described embodiments of the invention can be implemented in hardware in a computer system and/or in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for use in a CD ROM) or a floppy disk (for eventual use in a floppy disk drive), or downloaded via the Internet or other computer network, as discussed above. The present invention applies equally regardless of the particular type of signal-bearing media utilized.

The foregoing description of the preferred embodiments of the invention has been presented for the purposes of illustration and description. It is not intended to be exhaustive or to limit the invention to the precise form disclosed. Many modifications and variations are possible in light of the above teaching. For example, although preferred embodiments of the invention have been described in terms of the Internet, other network environments including but not limited to wide area networks, intranets, and dial up connectivity systems using any network protocol that provides basic data transfer mechanisms may be used.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

The invention claimed is:

1. A method for controlling a display of pages retrieved over a network by a browser program, comprising:
   predefining, within the browser program, independently of a time specified within any particular page, a minimum threshold of time any page is to be displayed to enable the page to be in queue to be redisplayed in response to a user selection to go back through a sequence of previously displayed pages;
   determining a time that a given page is visibly displayed;
   enabling the given page to be in queue to be redisplayed in response to a user selection to go back through a sequence of previously displayed pages if the time meets the predefined minimum threshold; and
   preventing the given page from being in queue to be redisplayed in response to the user selection of a back function to go back through the sequence of previously displayed pages if the time is less than the predetermined minimum threshold, thereby avoiding a redirection from the given page in response to a selection by the user of the back function.

2. The method of claim 1 wherein enabling the given page to be in queue to be redisplayed in response to a user selection further comprises storing an identifier for the page in a memory in a way representative of a sequence in which the page is displayed.

3. The method of claim 2 further comprising utilizing, by the browser, the sequence of identifiers in memory to display a subsequent page in response to a request to go back to a previous page.

4. The method of claim 1 wherein the predetermined minimum threshold is enabled to be set via a user preference.

5. A computer program on a computer usable tangible medium having computer readable program code means for controlling a display of pages retrieved over a network by a browser program, comprising:
   instruction means for predefining, within the browser program, independently of a time specified within any particular page, minimum threshold of time any pane is to be displayed to enable the page to be in queue to be redisplayed in response to a user selection to go back through a sequence of previously displayed pages;
   instruction means for determining a time that a given page is visibly displayed;
   instruction means for enabling the given page to be in queue to be redisplayed in response to a user selection to go back through a sequence of previously displayed pages if the time meets the predefined minimum threshold; and preventing the given page from being in queue to be redisplayed in response to the user selection of a back function to go back through the sequence of previously displayed pages if the time is less than the predetermined minimum threshold, thereby avoiding a redirection from the given page in response to a selection by the user of the back function.

6. The computer program of claim 5 wherein the instruction means for enabling the given page to be in queue to be redisplayed in response to a user selection further comprises instruction means for storing an identifier for the page in a memory in a way representative of a sequence in which the page is displayed.

7. The computer program of claim 6 further comprising instruction means for causing the browser to utilize the sequence of identifiers in memory to display a subsequent page in response to a request to go back to a previous page.

8. A computer system having means for controlling a display of pages retrieved over a network by a browser program, comprising:

means for predefining, within the browser program, independently of a time specified within any particular page, a minimum threshold of time any page is to be displayed to enable the page to be in queue to be redisplayed in response to a user selection to go back through a sequence of previously displayed pages;

means for determining a time that a given page is visibly displayed;

means for enabling the given page to be in queue to be redisplayed in response to a user selection to go back through a sequence of previously displayed pages if the time meets a predetermined minimum threshold; and preventing the given page from being in queue to be redisplayed in response to the user selection of a back function to go back through the sequence of previously displayed pages if the time is less than the predetermined minimum threshold, thereby avoiding a redirection from the given page in response to a selection by the user of the back function.

9. The computer system of claim 8 wherein means for enabling the given page to be in queue to be redisplayed in response to a user selection further comprises means for storing an identifier for the page in a memory in a way representative of a sequence in which the page is displayed.

10. The computer system of claim 9 further comprising means for utilizing, by the browser, the sequence of identifiers in memory to display a next page in response to a request to go back to a previous page.

11. The computer system of claim 8 wherein the predetermined minimum threshold is enabled to be set via a user preference.

12. A computer system having a browser program for controlling a display of pages retrieved over a network, comprising:

a bus system;

a memory connected to the bus system, wherein the memory includes a set of instructions that predefine, within the browser program, independently of a time specified within any particular page, a minimum threshold of time any page is to be displayed to enable the page to be in queue to be redisplayed in response to a user selection to go back through a sequence of previously displayed pages; and a processing unit connected to the bus system, wherein the processing system executes the set of instructions to determine a time that a given page is visibly displayed; and enabling the given page to be in queue to be redisplayed in response to a user selection to go back through a sequence of previously displayed pages if the time meets the predefined minimum threshold; and preventing the given page from being in queue to be redisplayed in response to the user selection of a back function to go back through the sequence of previously displayed pages if the time is less than the predetermined minimum threshold, thereby avoiding a redirection from the given page in response to a selection by the user of the back function.

* * * * *

UNITED STATES PATENT AND TRADEMARK OFFICE
CERTIFICATE OF CORRECTION

| | | |
|---|---|---|
| PATENT NO. | : 7,013,423 B2 | Page 1 of 1 |
| APPLICATION NO. | : 10/185509 | |
| DATED | : March 14, 2006 | |
| INVENTOR(S) | : David Earl Blaschke and Scott Thomas Jones | |

It is certified that error appears in the above-identified patent and that said Letters Patent is hereby corrected as shown below:

Column 8, line 21, please insert --Having thus described the invention, what we claim as new and desire to secure by Letters Patent is set forth in the following claims.--;

Column 8, line 60, please insert --a-- before "minimum";

Column 8, line 60, please delete "pane" and insert --page--.

Signed and Sealed this

Eighth Day of May, 2007

JON W. DUDAS
*Director of the United States Patent and Trademark Office*